M. S. ELLIOTT.
BUTTON SETTING MACHINE.
APPLICATION FILED NOV. 20, 1916.
Reissued Aug. 21, 1917. 14,344.
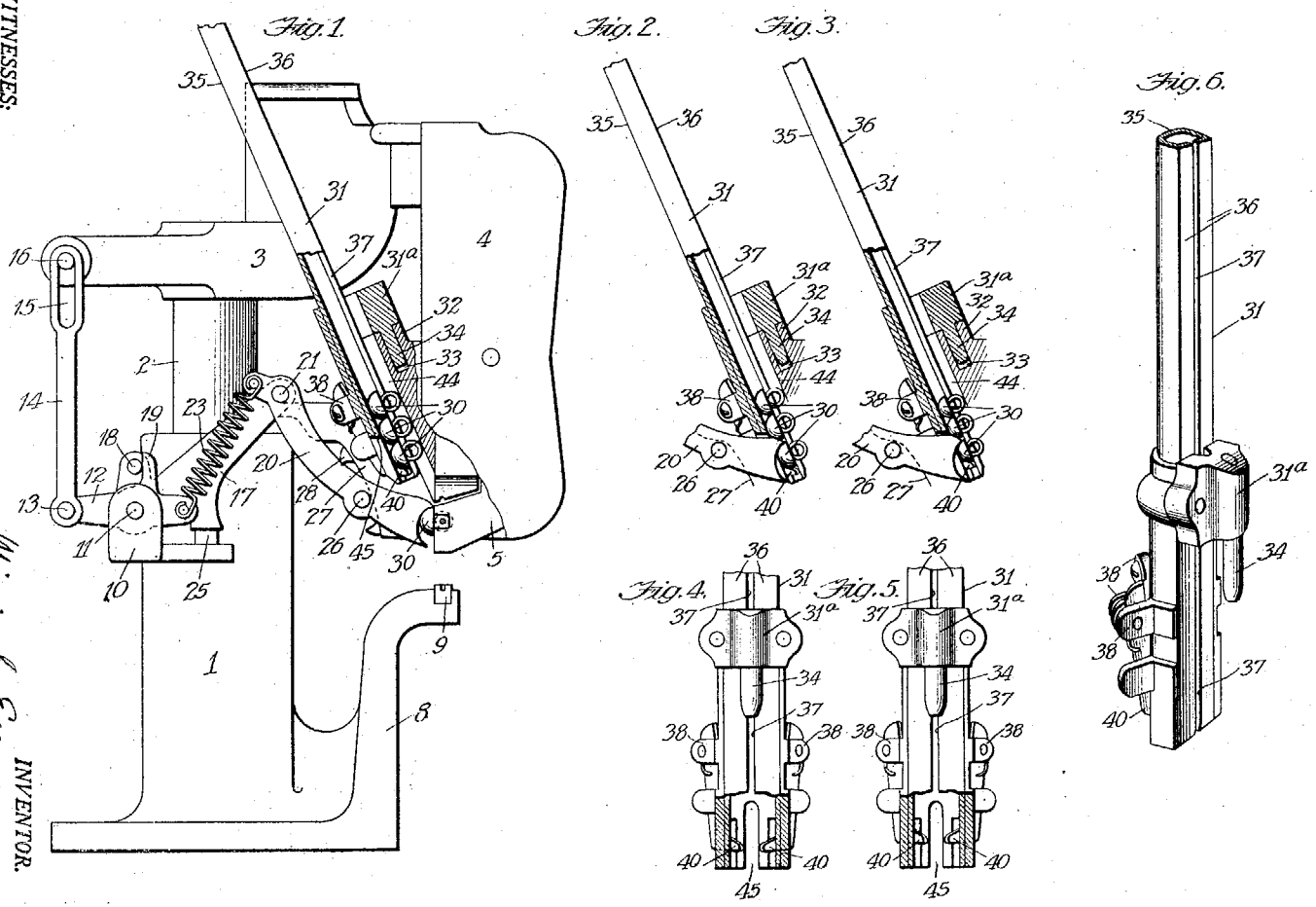
WITNESSES:
Martin H. Olsen
Robert Dolberman
INVENTOR.
Minnie S. Elliott
BY Rector, Hibben, Davis & Macauley
Her ATTORNEYS.

UNITED STATES PATENT OFFICE.

MINNIE S. ELLIOTT, OF GRAND RAPIDS, MICHIGAN, ASSIGNOR, BY MESNE ASSIGNMENTS, TO ELLIOTT MACHINE COMPANY, A CORPORATION OF MAINE.

BUTTON-SETTING MACHINE.

14,344. Specification of Reissued Letters Patent. Reissued Aug. 21, 1917.

Original No. 765,616, dated July 19, 1904, Serial No. 606,438, filed September 19, 1896. Application for reissue filed November 20, 1916. Serial No. 132,485.

*To all whom it may concern:*

Be it known that I, MINNIE S. ELLIOTT, a citizen of the United States, residing in the city of Grand Rapids, in the county of Kent and State of Michigan, have invented a certain new and useful Improvement in Button-Setting Machines, of which the following is a specification.

My invention relates to an improvement in that class of button-setting machines in which the buttons are carried in a button-chute and delivered to a staple-forming point, where a length of wire sufficient to form a staple is fed transversely through the eye of the button and formed into a staple, after which the button and attached staple are carried on to a clenching anvil or die, where the staple is driven through the fabric to which the button is to be attached and has its prongs clenched upon the opposite side thereof.

The object of the invention is to adapt such a machine for use with a plurality of detachable and interchangeable button chutes of different sizes, containing buttons of widely varying sizes, whereby one and the same machine may be adapted for use with a wide range of buttons.

I have described in the specification and illustrated in the drawings so much only of such a machine as will suffice for a clear explanation of my invention. The remaining features of the machine, not claimed herein as my invention, are the invention of William E. Elliott and form the subject-matter of letters patent issued to him, one of which is No. 799,549, dated September 12, 1905.

In the accompanying drawings, Figure 1 is a side view, partly in section, of a button-setting machine embodying my invention; Fig. 2 a sectional detail of certain of the parts shown in Fig. 1, with the button-feeding finger engaged with the lowermost button in the chute; Fig. 3 a corresponding view, showing a button chute of a different size from that shown in Fig. 2 and containing smaller buttons; Figs. 4 and 5 detail rear views, partly in section, of the lower ends of the button chutes shown in Figs. 2 and 3, respectively; and Fig. 6 a perspective view of one of the detachable and interchangeable button chutes, detached from the machine.

The same letters of reference are used to indicate corresponding parts in the several views.

1 indicates the main casting of the machine, in which is mounted a spring-pressed plunger 2 having a plunger-head 3. The plunger is given a reciprocating motion by means of foot power or any other suitable means, (not shown,) and the moving parts of the staple former and driver all receive their motion from the movement of the plunger transmitted through the plunger-head.

4 indicates that portion of the main casting which incloses the staple-former 5, the staple-cutter and bender, and other portions of the mechanism not necessary to be explained here, but which will be found illustrated and described in detail in the Elliott Patent No. 799,549 heretofore referred to. 8 is the support for the anvil or die 9 against which the staple is driven by the staple-driver and clenched.

Mounted upon the casting 1 is a bracket 10 on which is pivoted at 11 a lever 12. The rear end of this lever 12 is connected by a link 14 with the plunger-head 3, the lower end of the link being pivoted to the lever 12 at 13 and its upper end being provided with a slot 15 engaging a pin 16 on the plunger head.

A second arm or lever 17 is also pivoted on the bracket 10 at 11 and carries a stud 18 adapted to be engaged by an upwardly projecting arm 19 of the lever 12.

Pivoted to the upper forward end of the arm 17 at 21 is the upper rear end of the button-feeding finger 20. The rear end of this finger 20 projects rearward beyond the pivot 21 and is connected by a coiled spring 23 with the front end of the lever 12, with the result that said spring acts both upon the arm 17 and the finger 20, serving to yieldingly hold the former in its lower normal position against a stop 25, as shown in Fig. 1, and tending to rock the latter upon its pivot and lift its lower forward end. The finger 20 is provided with a laterally projecting stud 26 which bears against the curved rear edge of a guide plate 27. The lower forward end of the feed-finger 20 is suitably shaped to engage and coöperate with the heads of the buttons which are to be fed by it.

The supplies of buttons are carried in a plurality of detachable and interchangeable button-chutes of different sizes, of which three are shown in the accompanying drawing. These button chutes, of different sizes, are adapted and intended to receive and carry buttons of widely varying sizes, and to be substituted one for another in the machine shown in Fig. 1, and are of such construction and adapted to be detachably mounted in the machine in such relation to the button-feeding mechanism that the feeding finger 20 of that mechanism will properly coöperate with the buttons of widely varying sizes that may be contained in the several different chutes.

Each of the detachable and interchangeable button-chutes consists, in the form shown in the accompanying drawing, of a tube 31 open at its opposite ends and having a rounded side 35 to conform to the heads of the buttons and an opposite flat side 36, the latter being provided with a slot 37 extending from end to end of the tube, to receive the eyes of the buttons. Surrounding and secured to each button chute 31, in the present instance at a point toward its lower end, is a casting 31[a] provided at the flat side of the chute with a depending stud or pin 34. Secured to or formed integral with the casting 4 of the machine, Fig. 1, is a button-chute mounting-block 32, having a flat inclined rear face adapted to fit the flat forward side of the button-chute 31 beneath the casting 31[a] thereon. This mounting-block 32 is provided with a socket 33 adapted to receive the pin or stud 34 carried by the button-chute, and its upper surface surrounding the socket 33, serves as an abutment to limit the downward movement of the button-chute and properly position it longitudinally in the machine. The mounting-block 32 is also provided with a groove 44 to receive the eyes of the buttons projecting through the slot in the button-chute, as shown in Figs. 1, 2 and 3.

Under the foregoing construction and arrangement of parts any one of the several button-chutes of different sizes may be readily attached to and detached from the machine, and said chutes substituted one for another as occasion may demand. Each chute 31 is provided in the lower end of its rounded rear side 35 with a longitudinal slot 45, best shown in Figs. 4 and 5, to permit the entrance of the operating end of the feed finger 20 into the chute, to engage the head of the lowermost button therein, as shown in Figs. 2 and 3, and deliver it to the staple-forming point in the manner hereinafter described. The row or column of buttons is yieldingly supported in the tube, with the lowermost button in position for its head to be engaged by the feed-finger 20, by spring-pressed retaining fingers 40 pivoted near their upper ends in ears 38 on the rear side of the tube 31 and provided with inturned lower ends projecting through slots in the tube into position to engage the head of the lowermost button.

The several detachable and interchangeable button chutes 31 are, as stated, of different sizes, and are adapted to receive and hold, respectively, buttons of widely varying sizes. Of the three chutes shown in the accompanying drawings, that shown in Fig. 3 is the one of smallest size and contains buttons of corresponding size; that shown in Fig. 2 is the next larger size, and contains the next larger sized buttons; and the chute shown in Fig. 1 is intended to represent a chute of still larger size, containing buttons of corresponding size. At each operation of the machine the depression of the plunger 2 and plunger-head 3 by means of the foot-treadle or other power will, through the medium of the link 14, lever 12, and arm 17, serve to lift the feed-finger 20 upward and rearward to a certain definite point, at which its recessed forward end must properly engage the head of the lowermost button in the chute in order to withdraw it therefrom and advance it to the staple-forming point at the downward and forward movement of the feed-finger. Inasmuch as the heads of the buttons in the several different detachable and interchangeable chutes are of widely varying sizes, provision must be made for so positioning the lowermost button in each chute, when attached to the machine, that the feed-finger will properly coöperate with it regardless of the size of button, and to accomplish this I locate the spring-retaining fingers 40 upon the lower ends of the button-chutes at varying distances from the lower ends of the chutes, and consequently, assuming chutes of equal length, at varying distances from the chute-positioning abutment of the mounting-block 32, according to the sizes of the buttons contained in the respective chutes. The smaller the buttons the higher the retaining fingers are located, and the larger the buttons the lower the retaining fingers are located, the adjustment being such that the retaining fingers upon each chute will hold the upper edge of the lowermost button in the chute, when introduced into the machine, in substantially the same position in relation to the finger 20 of the button-feeding mechanism, no matter what the size of the button may be. Thus, in the accompanying drawing, it will be seen that the engaging ends of the retaining fingers 40 are located higher up and farther away from the lower end of the chute in Figs. 3 and 5 than in Figs. 2 and 4, and that they are still lower and nearer the end of the chute in Fig. 1 than in Figs. 2 and 4.

Under the above-described construction and provisions, the operation of the machine is as follows: One or another of the detachable and interchangeable button-chutes, containing buttons of the size desired for immediate use, having been introduced into the machine, as shown in Fig. 1, and the fabric to which the buttons are to be attached having been placed in position on the anvil 9, the operator depresses the foot treadle of the machine or by other means lowers the plunger 2 and plunger-head 3. This would cause the staple-forming and driving devices to operate to form and drive a staple and attach a button to the fabric if there were a button in position at the staple-forming point at the beginning of the operation, as shown in Fig. 1; but assuming that the operation to be described is the first of a series of new operations of the machine, as for instance upon buttons of a different size from those just previously used, there would be no button at the staple-forming point at the beginning of the operation and the action of the staple-forming and driving devices would be an idle one. Under such circumstances the downward movement of the plunger and plunger-head will cause the rocking of the lever 12 on its pivot 11, and the upwardly projecting arm 19 of said lever, engaging the pin 18 on the arm 17, will cause the upper forward end of the arm 17 to be swung upward and rearward against the resistance of the coiled spring 23, which will be stretched and put under additional tension by such movement of the parts. This upward and rearward movement of the front end of the arm 17 will carry the upper rear end of the feed-finger 20 with it, and the downward pull of the spring 23 upon the projecting rear end 22 of the feed-finger will tend to swing its lower forward end upward, and will maintain the stud 26 in engagement with the curved rear edge of the guide plate 27 as the feed-finger is drawn upward and rearward. During this movement of the parts the stud 26 of the feed-finger will encounter and ride over the projecting rear end of a spring-pressed cam-plate 28 (illustrated and described in the Elliott Patent No. 799,549 heretofore referred to) which will cause the lower forward end of the feed-finger 20 to be swung rearward momentarily as the stud 26 rides over the end of the plate 28, after which the stud 26 will come to rest at the end of the upward movement of the parts, above the end of the plate 28, as shown in Figs. 2 and 3. At the return downward movement of the parts, due to the release of the foot-treadle and the lifting of the plunger and plunger-head, the spring 23 will swing the upper forward end of the arm 17 downward and forward toward normal position, carrying the feed-finger 20 with it, and the recessed lower forward end of the feed-finger will engage the lowermost button in the chute and withdraw it therefrom and carry it downward to the position of the button 30 shown in Fig. 1, where it will be arrested at the staple-forming point by the contact of the eye of the button with a suitable abutment provided for the purpose. During such return downward and forward movement of the feed-finger the cam plate 28 will yield when engaged by the stud 26 on the feed-finger, and the latter will press it forward out of the way and pass freely by it, while the operative end of the feed-finger remains engaged with the lowermost button.

When the button has been brought to the staple-forming point, in the manner above described, a length of wire sufficient to form a staple will be fed transversely through the eye of the button from a supply of wire carried in a coil at one side of the staple-forming point, and such length of wire will be severed from the supply and formed into a staple by the staple-forming devices, after which the staple-driving devices will carry the button and attached staple on downward into contact with the fabric resting upon the anvil 9, where the prongs of the staple will be driven through the fabric and clenched upon its underside to secure the button thereto.

The eyes of all of the buttons of varying sizes are of substantially the same size, the heads only of the buttons varying in size, and inasmuch as the buttons are arrested at the staple-forming point by contact of their eyes (rather than of their heads) with the abutment at such point, it follows that the upper sides or edges of the heads of the buttons will come to rest at varying distances above such point, depending upon the sizes of the button heads; but inasmuch as the downward and forward movement of the feed-finger is a yielding one, caused by the action of the spring 23, the feed-finger 20 may be arrested in its downward movement whenever the eye of the button engaged by its contacts with the abutment at the staple-forming point regardless of the size of the head of the button, the spring 23 permitting the feed-finger to yield and come to rest, if the size of the button head is such as to require it, before the plunger and plunger-head and parts positively connected with them have quite reached normal position at their return movement.

While I have illustrated in the accompanying drawings and so far described all of the supplies of buttons for the machine as being carried in the detachable and interchangeable chutes of different sizes, in practice one of such chutes, adapted to receive buttons of the size most generally used, will be connected with a hopper containing a larger supply of buttons than can be held in a single chute, and provision be made for the automatic feeding of the buttons from the hopper into the chute, as shown and described, for instance, in the Elliott Patent No. 799,549, heretofore referred to.

Having thus fully described my invention I claim:

1. In a button-setting machine in which eye-shanked buttons are fed to a staple-forming point and there have staple-forming wire passed through their eyes and formed into staples, the combination of a supporting frame, a spring-controlled button-feeding mechanism mounted on said frame and automatically adjustable for feeding buttons of various sizes, a button-chute-holder on said frame provided with means for receiving and locating a button-chute thereon and with engaging means to coöperate with engaging means on the button-chute, and a detachable button-chute adapted to encircle the heads of the buttons and carry a column of buttons; said chute being provided on one side with a longitudinal slot for receiving and guiding the eyes of the buttons and on its opposite side with a slot or opening to permit the button-feeding mechanism to engage the head of the lowermost button of the column of buttons and with locating and engaging means to cooperate with the locating and engaging means on the chute-holder, and further provided adjacent its lower end with yielding means for retaining and controlling the feed of the lowermost button in the chute; said yielding means being located in relation to the point of abutment of the locating means on the button-chute with the locating means on the chute-holder so that the lowermost button of the column of buttons in the button-chute will be presented in proper position for engagement by the button-feeding mechanism, substantially as described.

2. In a button-setting machine in which eye-shanked buttons are fed to a staple-forming point and there have a staple-forming wire passed through their eyes and formed into staples, a button-chute-holder mounted on the machine frame and provided with means for receiving and locating thereon one of a plurality of interchangeable button-chutes carrying columns of buttons of different sizes, and also provided with engaging means to coöperate with engaging means on the interchangeable button-chutes, in combination with a spring-controlled button-feeding mechanism having a feed-finger which is automatically adjustable for feeding buttons of various sizes, and a button-chute arranged to carry a column of buttons and provided with locating and engaging means to coöperate with the locating and engaging means on said chute-holder and with yielding means adjacent its lower end for retaining and controlling the feed of the lowermost button in the chute; said button-chute being also provided with a longitudinal slot for receiving and guiding the eyes of the buttons and with a slot or opening to permit the button feed-finger to engage the head of the lowermost button in the column of buttons, and said yielding means being located in relation to the point of abutment of the locating means on the button-chute with the locating means on the chute-holder so that the lowermost button of the column of buttons will be presented in proper position for engagement by said feed-finger, whereby buttons having heads of widely varying sizes may be fed to the staple-forming point by selectively using the interchangeable chutes, substantially as described.

MINNIE S. ELLIOTT.

Witnesses:
ELTON R. AVERILL,
ESTHER DE RYKE.

Copies of this patent may be obtained for five cents each, by addressing the "Commissioner of Patents, Washington, D. C."